(12) United States Patent
Grumstrup

(10) Patent No.: US 8,421,643 B2
(45) Date of Patent: Apr. 16, 2013

(54) AUTOMATIC VALVE SEATING INTEGRITY TEST

(75) Inventor: Bruce Frederick Grumstrup, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 327 days.

(21) Appl. No.: 12/957,836

(22) Filed: Dec. 1, 2010

(65) Prior Publication Data

US 2012/0139725 A1 Jun. 7, 2012

(51) Int. Cl.
*G08B 21/00* (2006.01)

(52) U.S. Cl.
USPC ........ 340/686.4; 340/540; 340/626; 340/679; 340/686.1

(58) Field of Classification Search .................. 340/540, 340/626, 679, 686.1, 686.4
See application file for complete search history.

(56) References Cited

U.S. PATENT DOCUMENTS

| 6,131,609 | A | 10/2000 | Metso et al. |
|---|---|---|---|
| 6,298,454 | B1 | 10/2001 | Schleiss et al. |
| 6,382,226 | B1 | 5/2002 | Larson et al. |
| 7,478,012 | B2 * | 1/2009 | Tewes et al. .................. 702/183 |
| 2005/0257618 | A1 * | 11/2005 | Boken .............................. 73/587 |
| 2007/0239400 | A1 * | 10/2007 | Skorpik et al. ................ 702/188 |

OTHER PUBLICATIONS

International Search Report for PCT/US2011/059772, mailed Mar. 8, 2012.
Written Opinion for PCT/US2011/059772, mailed Mar. 8, 2012.

* cited by examiner

*Primary Examiner* — Travis Hunnings
(74) *Attorney, Agent, or Firm* — Marshall, Gerstein & Borun LLP

(57) ABSTRACT

The present invention comprises methods for testing the valve seating integrity of a valve. The valve components that determine valve seating integrity are typically a valve seat and a valve closing element that engages the valve seat to close the valve. Examples of the test method described herein respectively test valve seating integrity during opening of the valve and during closing of the valve, and do so in all instances without interrupting the operation of a process control system that includes the valve, without isolating the valve, and without relying on user analysis.

40 Claims, 9 Drawing Sheets

AUTOMATIC VALVE SEATING INTEGRITY TEST

TECHNICAL FIELD

The present invention relates generally to process control systems including valves and, more particularly, to methods for automatically testing the valve seating integrity of one or more of the valves during normal valve operations.

BACKGROUND

Process control systems, like those used in chemical, petroleum or other processes, typically include pipes through which the flow of fluid or gas is adjusted by opening or closing valves. The valves are controlled by one or more process controllers communicatively coupled to one or more field devices via analog, digital or combined analog and digital signal transmission links called buses. The field devices may be, for example, valve positioners, switches and transmitters (e.g., transmitters of information from sensors of temperature, pressure, fluid level, flow rate, and valve stem position). The field devices are located within a process plant environment and perform process functions such as opening or closing valves, measuring process parameters, gathering diagnostic data, etc.

The process controllers may or may not be located within the process plant environment. They receive signals representing process measurements made by the field devices, and/or other information pertaining to the field devices, and they execute a controller application. The controller application runs, for example, different control modules which (a) make process control decisions, (b) generate control signals based on the received information, and (c) coordinate with control modules that are performed by processors located in the field devices. The control modules in the controller send the control signals over the transmission links to the field devices to thereby control the operation of the process.

Information from the field devices and the controller is usually made available over a communication link to one or more other hardware or software devices, such as operator workstations, personal computers, data historians, report generators, centralized databases, etc., typically placed in control rooms or other locations away from the harsher plant environment. These hardware devices run applications that may, for example, enable an operator to perform functions with respect to the process, such as changing settings of the process control routine, modifying the operation of the control modules within the controller or the field devices, viewing the current state of the process, viewing alarms generated by field devices and controllers, simulating the operation of the process for the purpose of training personnel, testing the process control software, keeping and updating a configuration database, etc., or testing or gathering data about any of the devices of the process control system, such as any type of valve used in the process control system.

A valve used in the process control system conventionally comprises, as components, a valve seat and a valve closing element which engages the valve seat to close the valve. When these components engage properly, there is a proper valve closure, and the valve has a satisfactory valve seating integrity. Through repeated use in operations of the process control system the valve components may deteriorate due to normal wear, erosion, corrosion, etc. By observing how the valve components work together, a judgment can be made of the soundness and condition of these components. The soundness and condition of the combination of valve components and their operation may be referred to as the valve seating integrity of the particular valve, sometimes also referred to as a valve signature profile. It is desirable to detect when the valve seating integrity is compromised because, when this occurs, the valve may not close properly, thus creating problems with the overall system. For example, leakage may occur when the valve seating integrity is compromised.

Another more specific example of what problems may arise as a result of deterioration in the valve seating integrity is in the case where a process plant system uses high pressured steam to generate power (e.g., 1000s of psi). A valve may be used to regulate the flow of the steam in the power generation system. If there is a problem with the valve, for example, a component of the valve is slightly eroded, then when a high amount of steam pressure is put through the valve, the slightly eroded component may quickly erode to a level where the uncontrolled high pressured steam becomes a danger in the system. In addition to the further damage that may occur to the valve seating components and the detrimental effect to the operation of the process control system, financial loss may also occur. In particular, financial loss may result from the loss of energy that is wasted through a valve with a poor seating integrity. Therefore, it is may be extremely important to find a problem with the valve seating integrity as soon as possible.

Conventional tests to check the valve seating integrity include acoustic valve tests and valve signature tests. Acoustic valve tests are designed to generate an acoustic signal in the vicinity of the valve as gas or liquid materials flow through the valve. With conventional acoustic tests, the structure-borne noise spectrum data indicating the sound level and sound frequency of a valve in good condition differs noticeably from the data obtained from a valve that is deteriorating beyond an acceptable level. These acoustic valve tests are computation intensive and require additional hardware, and are thus expensive to implement.

Conventional valve signature tests are used to detect valve problems, such as valve stem integrity, worn out seat components, the crossing of maximum or minimum friction thresholds, torque thresholds, seat positioning problems, seat erosion problems, and stick-slip conditions. However, conventional valve signature tests require either interrupting the process during the test or blocking in (i.e., isolating) the valve to avoid a process interruption. Additionally, the valve signature test requires a user to perform the test and to visually inspect and interpret the test results. The results produced by the valve signature test provide a plot of valve stem position versus pressure. A user generally needs to be experienced with valve signature graphs to determine when there is a problem. In addition to the need of an experienced user to interpret the results, the valve signature test is difficult to run and interpret every time a valve moves to or from the seating position.

Overall, conventional tests used to determine valve seating integrity require human intervention and analysis, and/or may require stopping the process control operation. In particular, a conventional valve signature test requires human intervention and analysis along with having to either (1) interrupt the process control system to perform the valve signature test as part of a maintenance routine or (2) implement block and bypass valves into the process control system, so that the block and bypass valves may be used to reroute the flow of material (e.g., liquid or gas) through the plant as the isolated valve is being tested. The block and bypass valves may also be referred to as isolation valves.

In case (1) the process plant may lose a considerable amount of production. In case (2) the plant owner has to initially invest a considerable amount of resources to implement the block and bypass valves and to invest in the man power that is required to operate the block and bypass valves when performing a seating integrity test on the valve. In particular, a user that is physically located near the bypass valve must coordinate with another user that manages the operational switch from the valve to the bypass valve. The user that is physically located near the bypass valve must manually turn open the bypass valve in accordance with directions from the managing user. After the operational switch to the bypass valve is complete, the user must manually secure and verify whether the valve is blocked out of the process. The user secures and verifies that the valve is blocked out of the process by turning the two block valves that are located at each end of the valve that is to be tested. The isolation of the valve requires additional valves, additional man power, and considerable worker coordination and time.

Moreover, because of the added cost, loss in production, and the additional labor that is involved when using the conventional valve seat seating integrity tests, the tests are not often run. Typically, the valve seating integrity tests are run once a year or every five years. With the disclosure provided below, similar tests results may be produced more frequently and/or may be produced without the problems described herein that are associated with conventional valve seat seating integrity tests.

SUMMARY

The present invention comprises a method for testing valve seating integrity without interrupting operation of the process control system or isolating the valve. The present invention further comprises automatically testing the valve seating integrity during the normal operations of the valve closing and/or opening. The method comprises providing a process control system that includes a valve operated at a setpoint that reflects the extent to which the valve is open and that is expressed as a percentage of fully open, in the range substantially from 0% (or below 0% in the case where the setpoint is required to compensate for calibration offsets) to 100%.

In one embodiment, the method includes receiving from a controller, included in the process control system, a control signal value that corresponds to a desired setpoint, and performing a valve closing operation according to that setpoint. The method may also include determining whether the received control signal value is at or below a predetermined cutoff value associated with the valve seating integrity for the valve during a closing operation. When the setpoint is at or below the cutoff value, there may be a determination of whether the position data is above the cutoff value. The position data represents the position of the valve stem as it responds to reach the valve seat in accordance with the setpoint value. If the setpoint value is at or below a cutoff and the position data is above the cutoff, then the method proceeds to read pressure data and position data associated with the closing of the valve.

The pressure and position data read during the closing operation may be compared, in real time, with a known good set of data. Alternatively, or additionally, the pressure and position data that is read during the closing operation may be compared, in real time, with a threshold value that is associated with a satisfactory seating integrity. For example, the threshold may be computed by determining a mathematical tolerance associated with a previously stored or a known good set of position and/or pressure data, or a slope determination of the position and/or pressure data, or any other technique that may be used to determine whether the valve has an acceptable valve seating integrity.

In an embodiment, the pressure and position data may be read and stored during the closing operation and may be compared with a previously stored set of pressure and position data that corresponds to an acceptable valve seating integrity. The method may further include determining, from the comparing operation, whether a tolerance value that is associated with a satisfactory seating integrity has been exceeded, and generating an alert in response to a determination that the predetermined threshold value has been exceeded.

The reading of the pressure and position data and comparing the pressure and position data is continued for as long as the gathered position data indicates movement of the valve or while the valve has not yet reached a steady state in accordance with the setpoint.

The embodiments described in the preceding paragraphs are employed during a valve closing operation. Other embodiments of the valve seating integrity testing method may be employed during a valve opening operation.

The opening test embodiment includes receiving, from the controller, a control signal value corresponding to the desired setpoint, and performing a valve opening operation according to that setpoint. The method also includes determining whether the received control signal value, corresponding to the setpoint for the opening operation, is at or above a predetermined cutoff value associated with the valve seating integrity for the valve during an opening operation. When the setpoint is at or above the cutoff value and the position data is less than the cutoff value, there is a reading of pressure data and position data associated with the opening of the valve. The gathered pressure and position data may be compared to a known good set of data.

Alternatively, the pressure and position data that is gathered during the opening operation may be compared, in real time, to tolerance values that are associated with an acceptable seating integrity. For example, there may be a mathematical tolerance associated with the pressure readings, the position data, both the pressure readings and the position data, or a slope determination of the pressure and position data, or any other technique that is used to determine whether the valve has an acceptable valve seating integrity. Alternatively, the read and stored pressure and position data may be compared with a previously stored set of pressure and position data that corresponds to an acceptable valve seating integrity.

The method may further include determining, from the comparing operation, whether a tolerance value that is associated with an acceptable valve seating integrity has been exceeded, and generating an alert in response to a determination that the predetermined threshold value (e.g., tolerance) has been exceeded.

The reading of the position and/or pressure data and the comparing of the position and/or pressure data to the threshold or tolerance is continued for as long as the gathered position data indicates movement or indicates that the valve has not yet reached a state that is in accordance with the setpoint.

The claims provide additional summary information. The summary is not a complete summary of all the embodiments described herein. The summary is intended as an introduction to the methods described herein.

DRAWINGS

Figure 8:
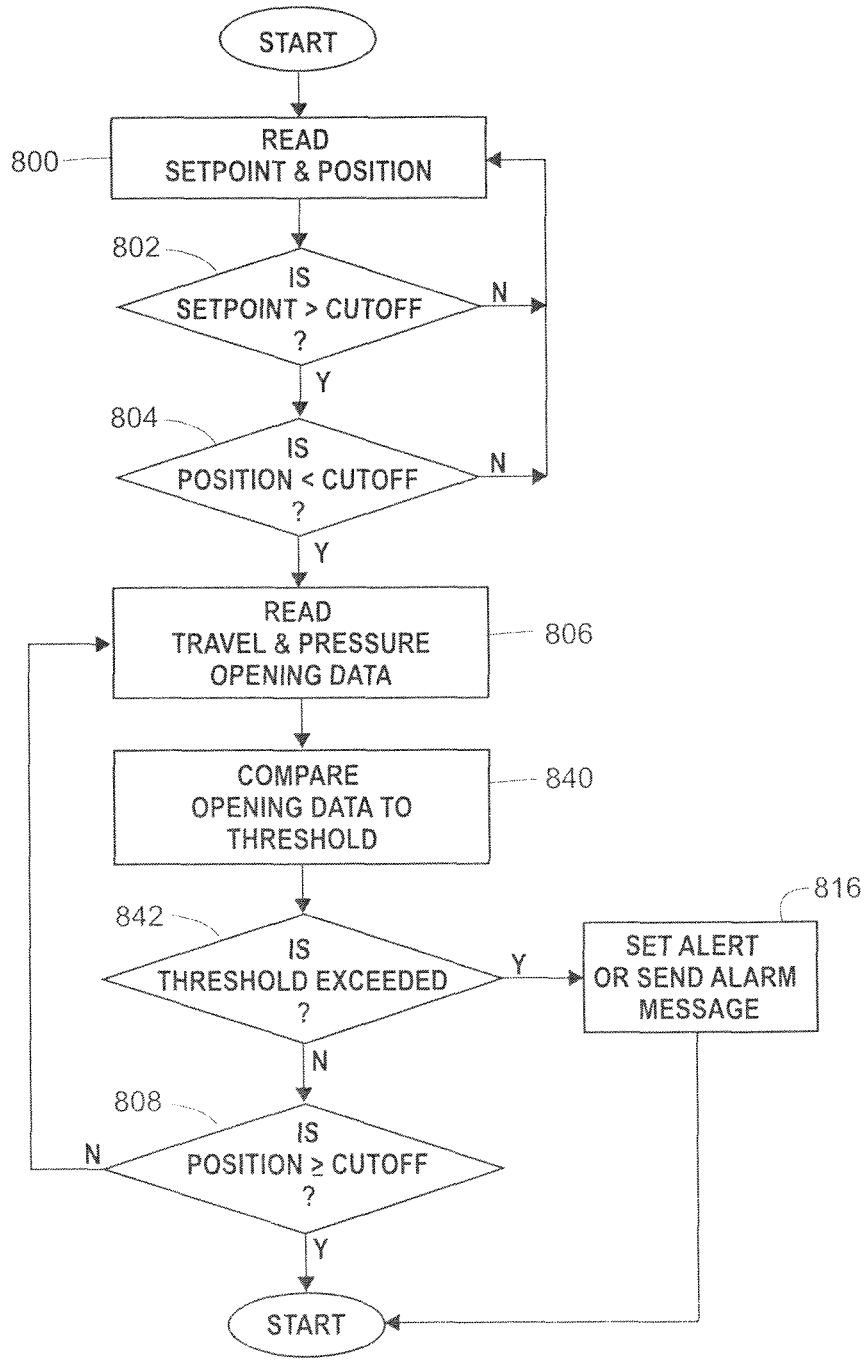
Figure 9:
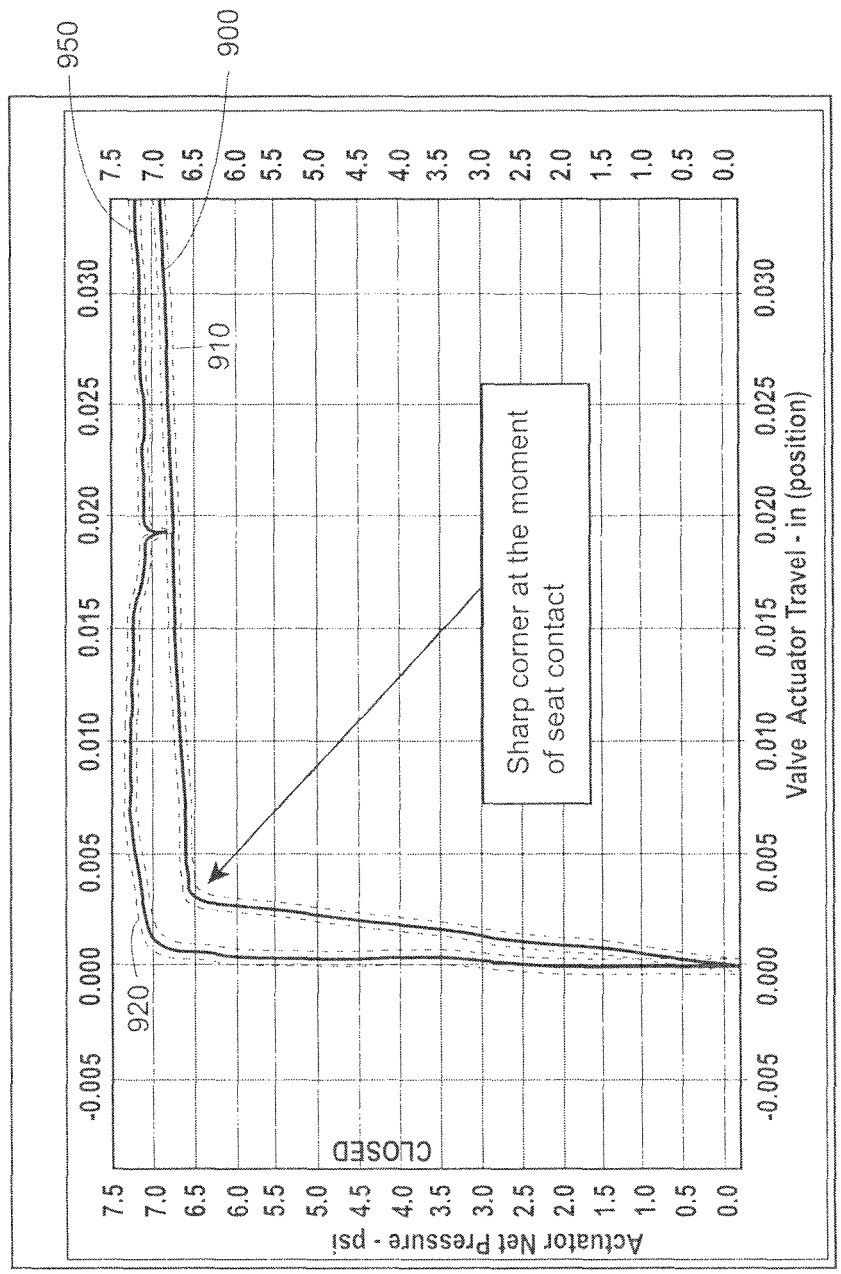
Figure 10:
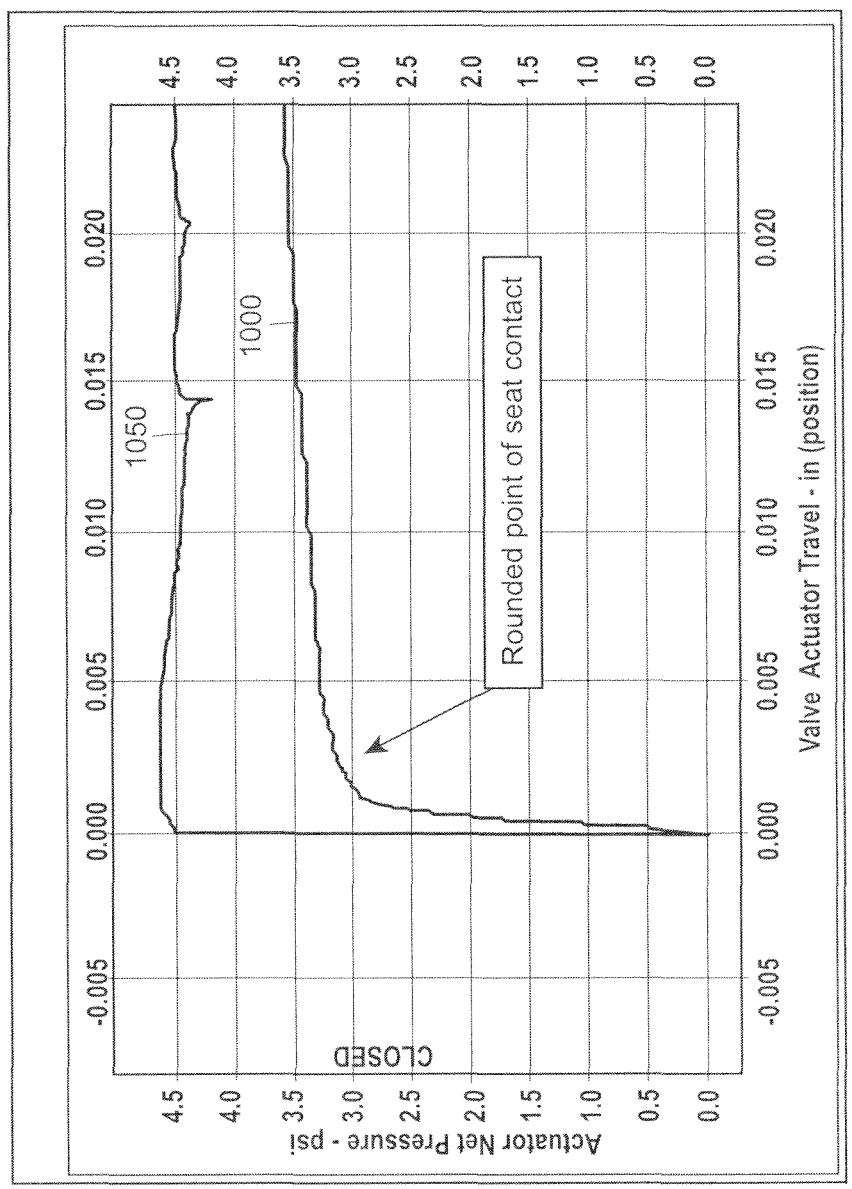

FIG. 8 is a flow diagram illustrating another example of a valve seating integrity test method that compares the position and pressure data in real time and in accordance with the present invention, and that is performed when the valve is opening; and FIG. 9 illustrates two graphical representations of valve test data, wherein one plot of data was read and/or stored during a valve closing operation and the second plot of data was read and/or stored during a valve opening operation, and wherein both plots are an example of data that represents a good valve seat integrity; and FIG. 10 illustrates two graphical representations of valve test data, wherein one plot of data was read and/or stored during a valve closing operation and the second plot of data was read and/or stored during a valve opening operation, and wherein the closing plot is an example of data that represents a poor valve seat integrity.

DESCRIPTION

The following detailed description sets forth embodiments of the present invention. Other embodiments are inherent in the subject matter claimed and disclosed or will become apparent to those skilled in the art from the following description in conjunction with the drawings.

Figure 1:
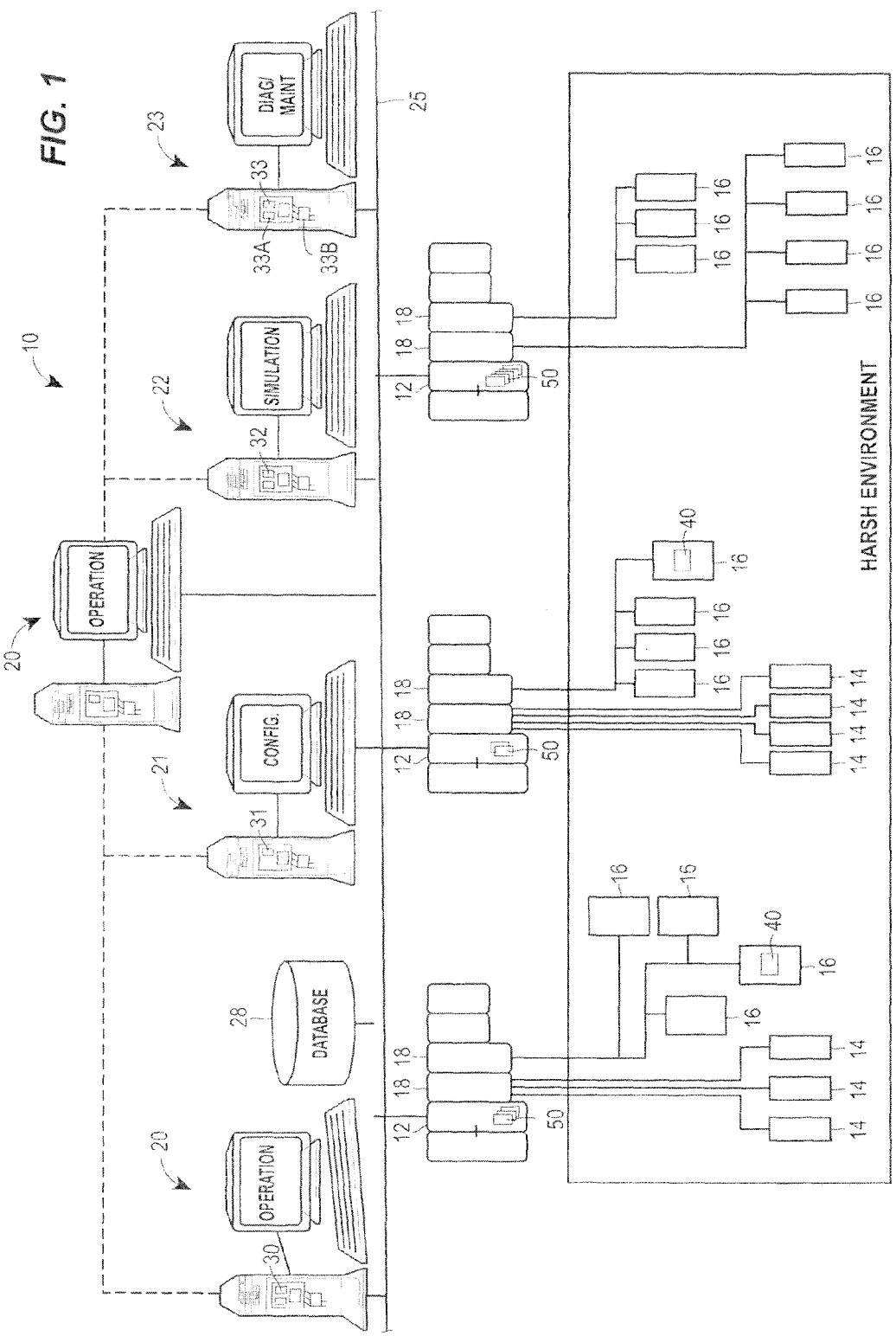
FIG. 1 is a block diagram of a process control system, located within a process plant that may control the valve during normal process operations.

FIG. 1 illustrates an example of a process plant 10 including various functional areas each of which may be provided with an embodiment of a valve seating integrity test system in accordance with the present invention. The process plant 10 includes a distributed process control system having one or more controllers 12, each connected to one or more field devices 14 or 16 via input/output (I/O) devices or cards 18. The controllers 12 are also coupled to one or more host or operator workstations 20-23 via a data highway 25. A database 28 is coupled to the data highway 25 and operates as a data historian to collect and store parameter, status, and other data associated with the controllers and field devices within plant 10 and/or as a data historian database that stores the current or previous test data of plant 10 as downloaded from or stored within the controllers 12 and/or field devices 14 and 16. The database 28 may additionally store graphical objects to provide various graphical representations of the process plant 10. An embodiment of the automatic seating integrity test method described herein may be stored as a routine as any one or more of software applications 30-33 on the respective one or more host or operator workstations 20-23. Alternatively, or additionally, an embodiment of the automatic seating integrity test method described herein may be stored at the controller 12 (e.g., software application 50) and/or at a storage 114 of positioner 109 of FIG. 2).

The field devices 14 and 16 may be located within a harsh process plant environment, while the controllers 12, I/O cards 18, operator workstations 20-23, and the database 28 may be located in control rooms or other less harsh environments that are more easily accessible by maintenance and various other process plant personnel. In some cases, process plant personnel may use mobile, wireless, handheld devices to access information that is generated by embodiments of the automatic valve seating integrity test method described herein.

Figure 2:
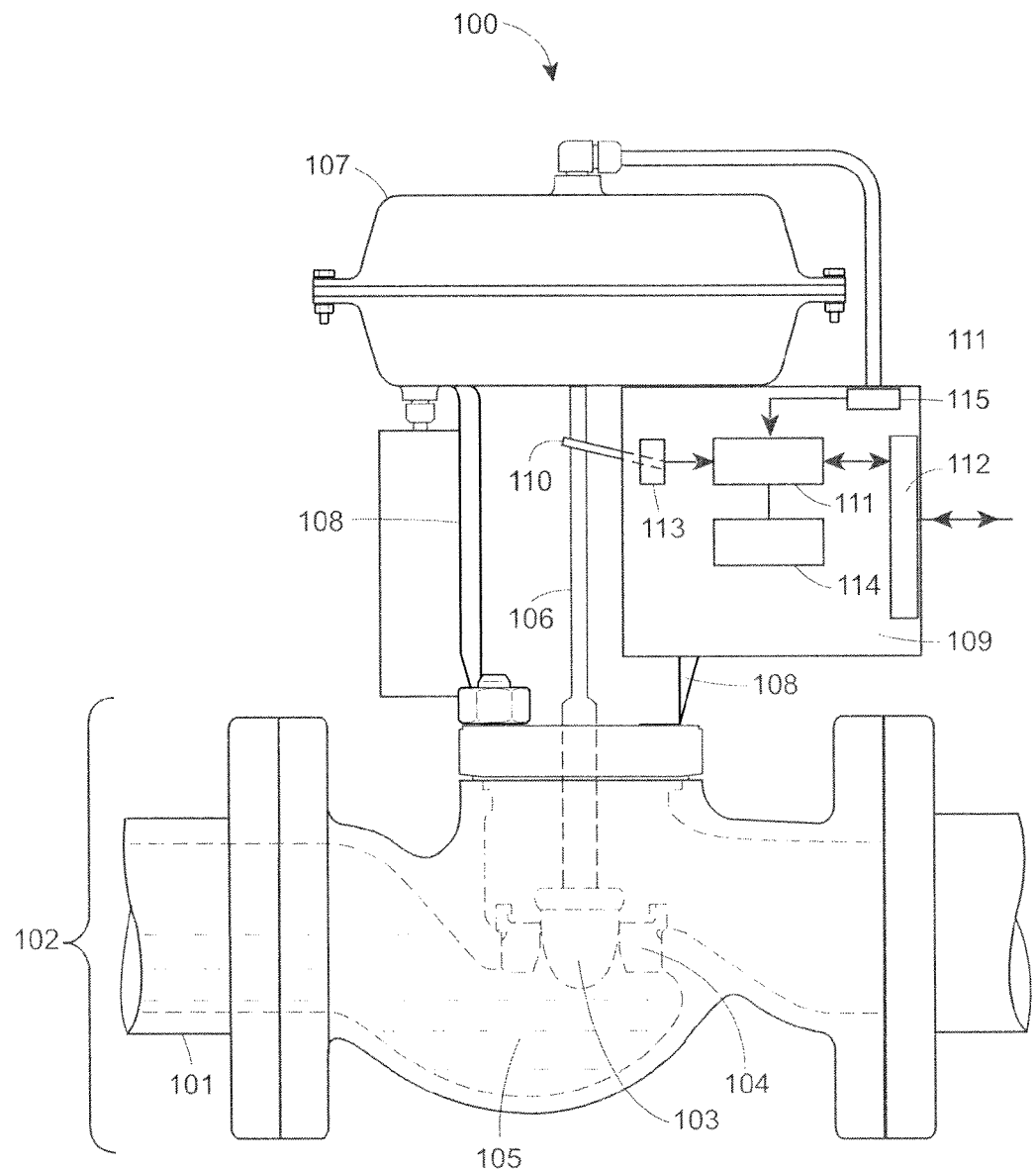
FIG. 2 is an elevational view of a control valve and associated equipment for use with the process control system of FIG. 1, and on which is performed a valve seating integrity test in accordance with an example of the present invention.

The valve seating integrity test method described herein may be integrated into different types of control systems. The control system may be a standalone control system or a distributed control system. A distributed control system includes controller elements that are not central in location but are distributed throughout the system with each sub-system controlled by one or more of the distributed controllers. An example of a distributed control system is illustrated in FIG. 1, which includes the valve illustrated in FIG. 2 as a part of a sub-system of the overall process control system operation, wherein system controller 12 controls the valve 102 that is illustrated in FIG. 2. For example, either analog field device 14 or digital field device 16 may represent the positioner of the valve seating integrity system illustrated in FIG. 2.

Alternatively, the valve seating integrity test method described herein may be integrated into a control system that may be executed entirely by the valve itself, such as the valve seating integrity system illustrated in FIG. 2. Additional information about embodiments of control systems and their control and diagnostics operations may be found in U.S. Pat. No. 6,298,454, titled "Diagnostics in a Process Control System," assigned to Fisher-Rosemount Systems, Inc., which is incorporated herein by reference in its entirety.

FIG. 2 illustrates an embodiment of a valve seating integrity test system 100 attached to a pipe 101 of a process plant, such as process plant 10 of FIG. 1. The flow of material 105 through pipe 101 is controlled by a control valve 102 comprising a valve closing element 103 coupled to a valve rod 106 or stem, and a valve seat 104. The material 105 may be a liquid or a gas. Valve rod 106 moves closing element 103 up or down to open or close the control valve 102. The valve is closed and/or opened with a force that is produced by a valve actuator 107, such as a pneumatic drive. The actuator 107 is coupled to the housing of valve 102 via a yoke 108. A positioner 109, such as an intelligent positioner, is mounted to the yoke 108 and is used to detect the movement of valve rod 106 via a valve movement indicator 110, such as a feedback rod. Valve movement indicator 110 is coupled to a valve position sensor 113, which is coupled to a valve control unit 111, which may be a processor, such as a central processing unit (CPU). Control unit 111 receives a setpoint value or control signal from an interface 112 that is coupled to a controlling device, such as workstations 20, 21, 22, 23 or controllers 12, 12 of FIG. 1. For example, control unit 111 may receive the setpoint or control signal from any controller 12 of FIG. 1. The setpoint is the target value that an automatic control system will send to a device it controls.

Alternatively, the valve movement indicator 110 may be a linkageless position feedback device, which employs methods of coupling and/or monitoring the valve rod 106 movement without having a direct connection with the valve rod 106. For example, the valve movement indicator 110 may be an electro-magnetically linked movement indicator.

As noted above, control unit 111 may receive the setpoint value from controller 12 and may then control the control valve 102 according to the received setpoint value. The setpoint value indicates how much the valve should be opened or closed. Control unit 111 causes the valve to move in accordance with the received setpoint value. Control unit 111 checks for feedback information from position sensor 113 and stores the position data from sensor 113 in a storage device 114. Positioner 109 also includes a pressure sensor 115 which, depending on the type of actuator 107, may be one or more pressure sensors. Data obtained by pressure sensor 115 may also be used by control unit 111 as a basis for moving valve 102 in accordance with the setpoint value. The pressure data from sensor 115 may also be stored in storage device 114. Also, as indicated above, a portion or whole of the software application of the valve integrity testing method described herein may be stored at the storage device 114.

Referring to FIGS. 1-2, during normal operation of the process control system that includes valve 102, the valve is operated at a setpoint which, as noted above, is an input to the control unit 111 of the positioner 109 in FIG. 2. As is also noted above, the setpoint defines the extent to which the valve is to open and is expressed as a percentage of a fully open valve. Thus, a setpoint value of 100% defines a fully open valve, wherein valve closing element 103 is spaced a maximum distance from valve seat 104; a setpoint value of 0% corresponds to a fully closed valve, wherein closing element 103 is seated on valve seat 104; and a setpoint value between substantially 0% and 100% corresponds to a partially open valve.

Depending on whether the test to verify valve seating integrity is to be performed during a valve closing or valve opening operation, the test occurs, for example, (i) when the setpoint value is less than a predetermined cutoff value, when the valve is closing, or (ii) when the setpoint value is above a predetermined cutoff value, when the valve is opening. A test occurs automatically during performance of a normal operation of the process control system comprising valve 102, an operation that includes either a closing of the valve or an opening of the valve, as the case may be. The tests that may occur during closing and opening are described below in detail, with reference to FIGS. 3, 5, 6, and FIGS. 4, 7, and 8, respectively.

Figure 5:
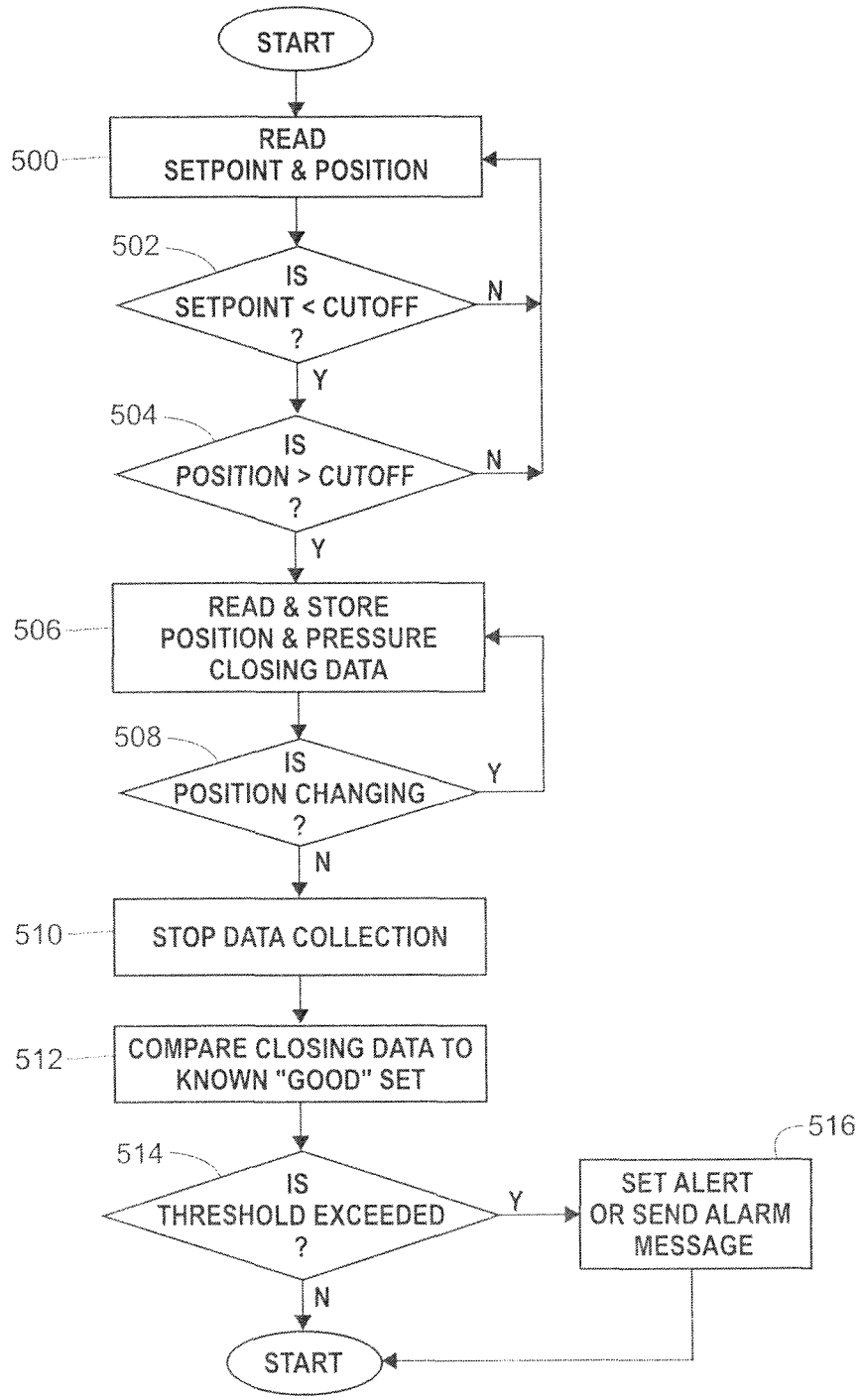
FIG. 5 is a flow diagram illustrating an example of a valve seating integrity test method in accordance with the present invention, and that is performed when the valve is closing.
Figure 6:
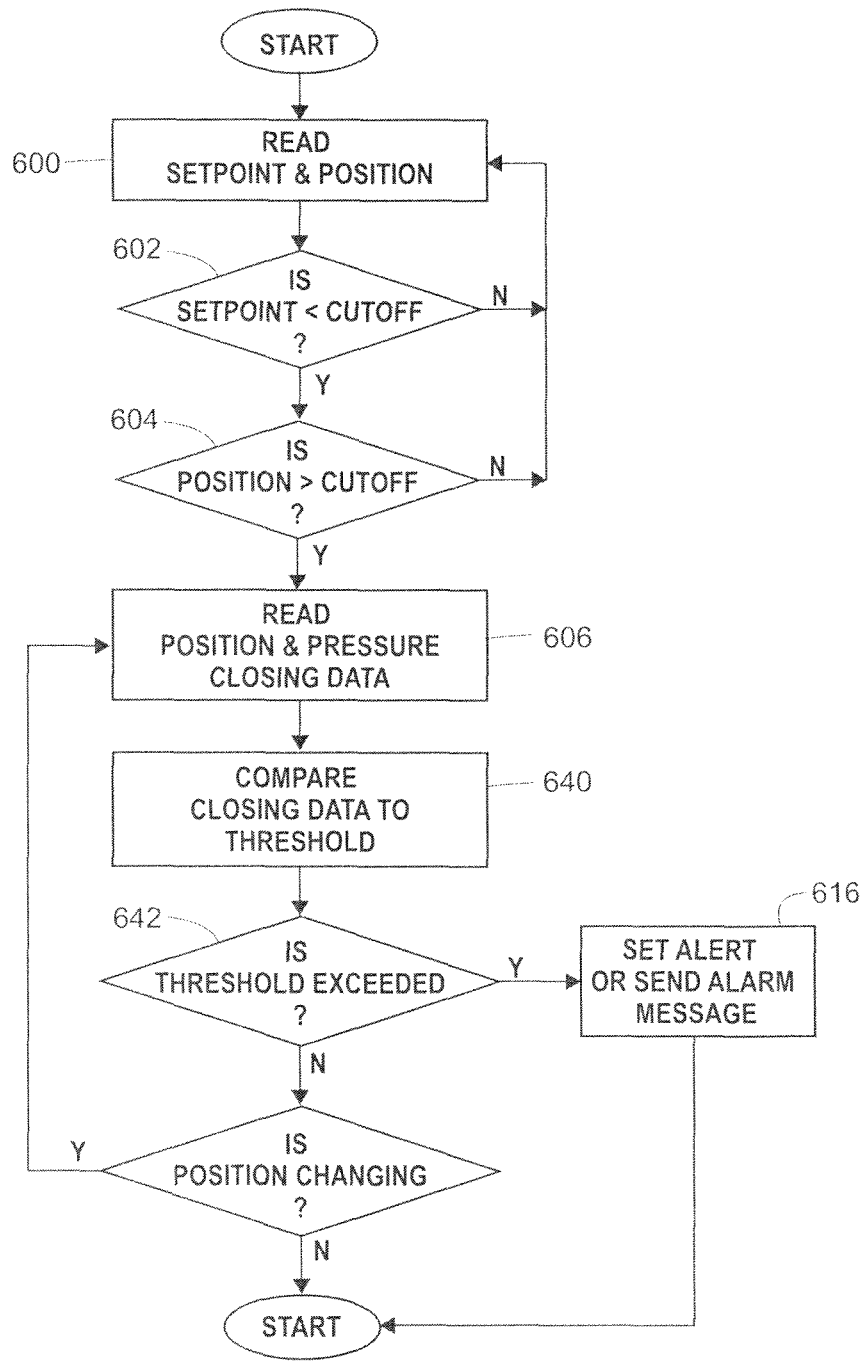
FIG. 6 is a flow diagram illustrating another example of a valve seating integrity test method that compares the position and pressure data in real time and in accordance with the present invention, and that is performed when the valve is closing.
Figure 7:
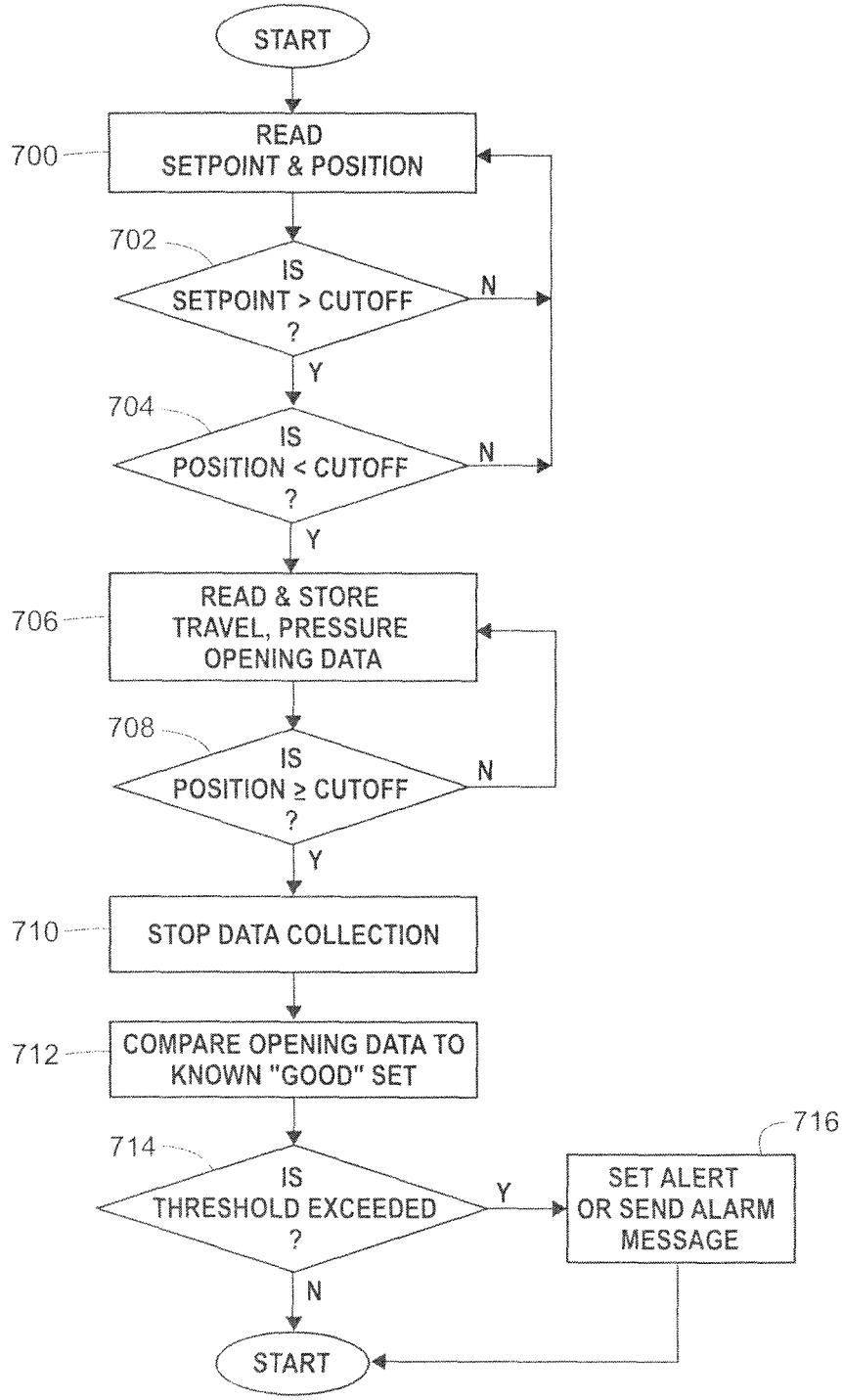
FIG. 7 is a flow diagram illustrating an example of the valve seating integrity test method performed when the valve is opening.

FIGS. 5 and 6 illustrate embodiments of the method that is performed when the valve is signaled to close. FIGS. 7 and 8 illustrate embodiments of the method that is performed when the valve is signaled to open. As discussed more fully below, the methods illustrated by FIGS. 5, 6, 7, and 8 employ a cutoff value that is used to determine when the position and/or pressure data start to be accumulated automatically. In this manner, the automatic collection of data is useful for detecting a valve seating integrity problem during the closing or opening of a valve during normal operations or the process control system of the process plant. Some or all of the blocks of FIGS. 5, 6, 7, and 8 may be performed during normal operations of a process plant that includes the valve that is being tested.

Figure 3:
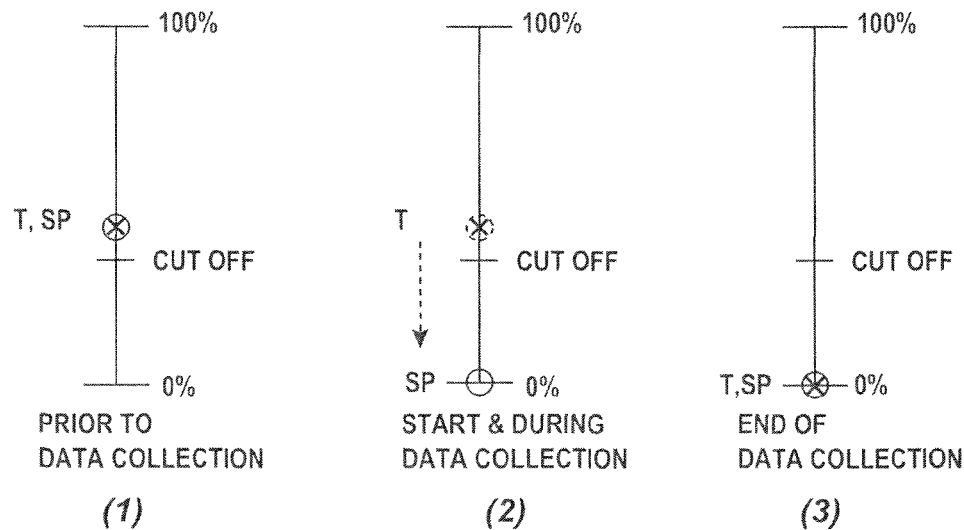
FIG. 3 illustrates how the position data may follow the setpoint value during the three general stages of an example valve seating integrity test method in accordance with the present invention, and that is performed when the valve is closing.
Figure 4:
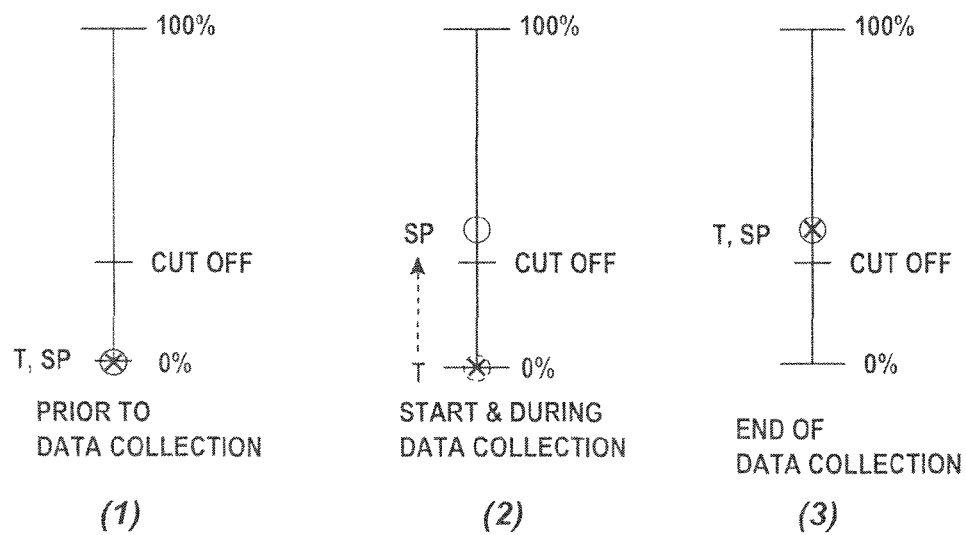
FIG. 4 illustrates how the position data may follow the setpoint value during the three general stages of an example valve seating integrity test method in accordance with the present invention, and that is performed when the valve is opening.

FIGS. 3 and 4 are provided to further explain the methods described herein. FIG. 3 illustrates the relationship between the setpoint value (SP which is illustrated as O), position data (T which is illustrated as X), and the cutoff value during a closing operation of the valve. FIG. 9 illustrates the relationship between the setpoint value SP, position data T, and the cutoff value during an opening operation of the valve.

FIG. 3 shows three different phases of an embodiment of a valve seating integrity test method that takes place during a normal valve closing operation. FIG. 3 provides additional explanation for understanding the operational blocks of FIGS. 5 and 6. For example, FIG. 3 shows the values of the setpoint SP and the position data T (position data may also be referred to as "travel" data) with respect to the cutoff value (CUTOFF). At a first stage, which is denoted by (1), the valve is open and has reached a steady state, e.g., wherein the position data is equivalent to the setpoint value. Thus, both the setpoint SP and the position data T are at values that represent the valve being open and these values are greater than the cutoff value CUTOFF. At a second stage, which is denoted by (2), the valve is open and has received a signal to close, e.g., a signal of a setpoint value of 0% open.

In ideal conditions the signal from the controller may only need to be a setpoint value of 0% open. However, in real world conditions a setpoint value of −5% open is sometimes used because the setpoint may need to compensate for calibration offsets that may exist in the valve system. During the second stage (2) the setpoint is at a value 0% open and the position data T, which indicates the position of the valve rod 106 (FIG. 2) relative to the valve seat 104 (FIG. 2), has not had a chance to reach the setpoint value SP. During the second stage (2) the position data T is greater than the cutoff value. During the second stage (2) the position data and/or pressure data may begin to be read for comparison to a threshold. While the position data T is still indicating that the valve rod 106 is moving to close the valve, the position and/or pressure data may be continuously read and compared to the threshold value/s or may be read and stored to be compared to the threshold value/s. The reading and comparison of the position and/or pressure data to a threshold will continue until the third stage (3), wherein the position data indicates that the valve rod 106 has reached a steady state position, e.g., 0% open.

As noted above, in the method illustrated by FIG. 5, the valve is signaled to close. Intelligent positioner 109 (FIG. 2) receives a setpoint from a controller (e.g., controller 12 of FIG. 1). The positioner 109 reads the setpoint and position data (block 500). As briefly noted above, the setpoint signal indicates the percentage that the valve is to be open, with 0% indicating 0% open (i.e., closed) and 100% indicating 100% open, with all possible values in between or beyond, if required. As noted above, the setpoint may be generated to overcompensate for errors, and thus may fall in a range beyond 0% to 100%, such as −5%. The position data is acquired by the use of the feedback rod 11 (FIG. 2) and the position sensor 113 (FIG. 2). The position data indicates the position of the valve rod 106 (FIG. 2) with respect to the valve seat 104 (FIG. 2).

Positioner 109 determines whether the setpoint is below a predetermined value, such as a cutoff value (block 502). The cutoff may be a value, such as 0.5% open. For example, if the total span of the valve when the valve is completely open is 6 inches measured from the valve seat 104 to the closing element 103, then the 0.5% open value would correspond to a distance that is 0.03 inches measured from the valve seat 104 to the closing element 103. The cutoff value may be specified by a user or provided by the manufacturer.

If the setpoint is determined to be below the example 0.5% open cutoff value (block 502,) then positioner 109 determines whether the position data is above the cutoff value (block 504). If the position data is above the cutoff, value, then the positioner 109 reads and stores the position data and pressure data using the respective position and pressure sensors (block 506). Positioner 109 checks if valve rod 106 is still moving (block 508). This may be determined by checking whether the position data is still changing or has not yet reached a steady state value associated with the setpoint value. If valve rod 106 is still moving, as indicated by position data that is still changing or moving toward the setpoint value, then positioner 109 keeps reading and storing the position and pressure data (block 506). When the valve rod 106 stops moving, the positioner 109 stops collecting the position and pressure data (block 510). If additional records of the closing operation are needed, then the positioner 109 may also store the setpoint value/s while it reads and stores the position and pressure data.

The setpoint value during a closing test can be 0% open, or it can be any value from slightly less than 0% open to a value that is less than the cutoff value (i.e., less than 0.5% open in this example). Valve movement stops when the valve is at a final desired position conforming to the desired setpoint received from controller 12 in FIG. 1. If the valve is determined to have stopped or to have reached a steady state value in response to the desired setpoint value, then the positioner 109 may compare the current gathered data to a model data set or a prior stored data set, known as a "good" set (block 512) and determine whether the comparison exceeds a threshold or is within a tolerance about a predetermined value (block 514).

The term tolerance is used herein to denote some value/s around a stored data set, such as a known "good" set of data. Whereas the term threshold is used herein to denote a mathematical value that may be derived from analysis of the known "good" set or any other mathematical value that may be used for determining when the gathered position and/or pressure data would indicate a problem with the seating integrity. The term threshold is broader and includes the tolerance value/s.

Additionally, a threshold may include a slope value that was determined from a previously gathered known "good" set of position and pressure data. A slope value that indicates the change of pressure over the change of position may be determined after each reading of the position and pressure data. The determined slope value may be compared to an expected or predetermined slope value for each reading of data. Alternatively, either position or pressure data may be read over time and the change in the position data or change in pressure data over time may be used to determine a real time slope value that may be compared with an expected corresponding slope value to determine if and when a deterioration of the seating integrity has occurred. Alternatively, a tolerance may be determined around a predetermined slope value that may be used in the comparison operation.

An example of a known "good" set of data is the test data that was gathered at the time the valve was new or was determined to be working properly, such as data that may be gathered using a signature valve test that was derived from measurements obtained either before installation or during some initial operating time. The manufacturer may also provide a baseline signature valve test graph that provides a "good" data set that may be used for comparison. Other "good" sets of data may be obtained from models of other valves, internal or external to the process plant. Still other "good" sets of data may be obtained from previously stored travel (position) data and pressure data for the valve being tested. Additionally, the stored data may be used to produce trend data. Alternatively, the trend data produced from the stored data may be compared with other trend data.

Trend data is data that may be used to model a data set. A trend may be estimated from a data set by using a statistical technique that aides in the interpretation of the data. For example, it may be useful to determine if the measurements of a data set exhibit an increasing or decreasing trend, which are statistically distinguishable from random behavior.

If the comparison of the gathered data with the known "good" set of exceeds a threshold value, positioner 109 may set an alert indication (block 516), which may be as simple as a local light turning off or on or any other visible alert indication that is located near the valve. Additionally, or alternatively, the positioner 109 may send an alarm message (block 516), which may include sending communications to any locally and/or remotely located devices. The alarm message may be an analog or digital message that is sent to a remotely located wireless portable communication device, or that is sent to a display of a diagnostic/maintenance workstation 23 of plant 10. If the comparison does not exceed a threshold, the method returns to start, either for testing valve seating integrity the next time the valve is closing or for testing valve seating integrity when the valve is opening, as illustrated in FIG. 7.

An example of a tolerance value is a value that is predetermined or set by a user to determine when the gathered position and/or pressure data is acceptable. A tolerance may be a selected value, such as is denoted by a 1% range about the data associated with either the position data and/or the pressure data. For example, illustrated in FIG. 9 by line 900 is an example of a "good" data set taken during a closing of the valve and taken from a manually performed signature valve test that graphs pressure values along the vertical axis and graphs position values along the horizontal axis.

The dashed lines of box 910 delineate a 1% tolerance range around the plot of individual position and pressure data sets of line 900. The illustration is an estimate and not drawn to scale. Similarly, line 950 in FIG. 9 indicates an example of a "good" data set taken during the opening of the valve and taken from the manually performed signature valve test and the dashed lines of box 920 delineate a 1% tolerance range around the plot of individual position and pressure data sets of line 950. If, for example, the gathered position and pressure data sets (corresponding to block 506) are compared to the "good" pressure data (corresponding to block 514 and line 900) and the gathered data falls outside the 1% tolerance depicted by dashed line 910, then the alert may be triggered (block 516).

Line 1000 of FIG. 10 is an example of a graphed plot of gathered sets of position and pressure data that were produced by a valve during a closing operation. The plotted data of line 1000 was determined by a trained maintenance person to be indicative of the valve having an unacceptable valve seating integrity. A trained maintenance person is experienced in recognizing that the lack of a sharp corner at the moment of seat contact is indicative of poor or unacceptable valve seating integrity. If the positioner 109 described herein were to read data that resembled the graphed plot of line 1000 in FIG. 10 (assuming the data is scaled to correspond to the graph of FIG. 9), then the positioner 109 would compare the data of line 1000 with the tolerance value/s 910 (block 514). If the tolerance value/s is exceeded then the positioner 109 would set an alert or send an alarm (block 516).

Thus, in addition to not having to take the process plant operation offline or to invest in additional valves, the method described herein may remove the reliance upon the judgment of maintenance personnel when testing the seating integrity of a valve since the positioner 109 is capable of performing a valve seating integrity test automatically during normal process plant operations.

Alternatively, the comparison between the plot of the sets of position and pressure data that were produced by a valve during a closing operation, which may resemble line 1000 in FIG. 10, and a known good set, such as line 900 of FIG. 9, may be more focused or specified to a more particular data range. For example, the comparison may be made in the range of data values that are associated with a narrower range of positioning between the closing element 103 and the valve seat 104. Alternatively, the comparison may be made with either the position data or the pressure data, such as by only comparing the position data that occurs in a particular range of pressure data, e.g., comparing only the position data that is associated with the pressures ranging from 6.75 to 6.25 psi with a 1% tolerance around the good set of position data or other specific ranges that are associated with a particular type of valve and its particular specifications.

Additionally or alternatively, the comparison operation (block 512) may be executed after each instance of reading the pressure and/or position data. For example, FIG. 6 illustrates an alternative embodiment of the valve seating integrity test method that is performed when the valve is closing. The embodiment illustrated in FIG. 6 illustrates the method with an alternative comparison operation that may require less storage of data. In particular, the operational blocks 600, 602, 604, 606, 608, and 616 are similar to operational blocks 500, 502, 504, 506, 508, and 516 of FIG. 5, respectively. Therefore, the below explanation of the method as illustrated by FIG. 6 is focused on the differences of the operations between FIG. 5 and FIG. 6.

FIG. 6 illustrates an alternative embodiment to FIG. 5, wherein the reading of data operation does not call for the additional storing of the data and wherein the comparison operation is performed more immediately after the reading of the data. The pressure and position data may be read and then compared to a tolerance or threshold on a real time basis, without requiring longer term storage. For example, the positioner 109 may read the pressure and position data (block 606) and then compare the pressure and position data with a threshold (block 640) and then determine whether the comparison exceeds the threshold (block 642).

An alternative embodiment of the seating integrity test method described herein, which may be used while a valve is opening, is described in FIG. 4. FIG. 4 illustrates the relationship between the setpoint value SP, position data T, and the cutoff value during the opening of the valve. FIG. 4 shows three different phases of the valve seating integrity test method to provide additional explanation when reading the description of the operation blocks of FIGS. 7 and 8. For example, FIG. 4 shows the values of the setpoint SP and the position data T with respect to the cutoff value CUTOFF. At a first stage, which is denoted by (1), the valve is closed and has reached a steady state. At this time the position data is equivalent to the setpoint value, wherein both the setpoint SP and the position data T are at a 0% open value. At a second stage, which is denoted by (2), the valve is closed and has received a setpoint value of 0.6% open.

During this second stage (2) the setpoint is at a value of 0.6% open and the position data T, which indicates the position of the valve rod 106 (FIG. 2) relative to the valve seat 104 (FIG. 2), has not had a chance to reach the setpoint value SP. During the second stage (2) the position data T is less than the cutoff. During the second stage (2) the position data and/or pressure data may begin to be read for comparison to a tolerance or threshold. While the position data T is still indicating that the valve rod 106 is moving to open the valve, the position and/or pressure data may be continuously read and compared to the tolerance or threshold values or may be read and stored to be compared to tolerance or threshold values. The reading and comparison of the position and/or pressure data to a threshold will continue until the third stage (3), wherein the position data indicates that the valve rod 106 has reached a steady state position that is no longer less than the cutoff value (i.e., greater than or equal to the cutoff value).

FIG. 7 illustrates an embodiment of the method that tests the integrity of the valve seating during a valve opening operation. For example, the valve may be in a closed position and may receive, from system controller 12 (FIG. 1), a setpoint value that indicates that the valve is to be opened. For example, the received setpoint may change from a value of 0% (i.e. closed) to a value of 0.6% open. If the valve opening cutoff value is 0.5% and the received setpoint value is greater than the 0.5% cutoff value (e.g., a setpoint of 0.6%), then the intelligent positioner 109, which reads the setpoint values (block 700), will have determined that the setpoint value is above the cutoff value (block 702).

If the setpoint value is above the cutoff value, then the positioner 109 determines whether the position data is below the cutoff value (block 704). If it is, then the positioner 109 reads and stores the position and pressure data (block 706) and keeps reading and storing the data while the position data is less than the cutoff value (block 706,708).

More particularly, positioner 109 receives the desired setpoint value from system controller 12 of FIG. 1 and moves valve closing element 103 in accordance with the desired setpoint value. Positioner 109 may have its own control processing capabilities. In this case, the positioner 109 receives the desired setpoint value from controller 12 and produces its own, localized, second setpoint value to achieve the desired setpoint value. A second setpoint value may be produced by the control unit 111. In an alternative embodiment, the positioner 109 reads the position information from movement indicator 110 and sends the position information to system controller 12 to use as feedback information. Corresponding operations are also possible for the valve closing operations.

As noted above, the desired setpoint value may be either one of (a) the desired setpoint value that is produced at a lower system level controller (positioner 109) or (b) the desired setpoint value that is produced by a higher system level controller (controller 12), which ever the case may be. Either way, the actual position should follow the desired setpoint value until the actual position achieves a steady state value that is in accordance with the desired system setpoint value.

An example of a desired system setpoint value is 0.6% open, 50% open, 75% open, or any other desired open value. For example, during the time that the position data has not yet reached the cutoff value, the valve 102 is considered to be still performing the opening operation. Until the position data reaches the desired cutoff value, positioner 109 reads and stores position and pressure data (blocks 706, 708). After the position data reaches the cutoff value or is still changing in an effort to reach the desired setpoint, the positioner 109 stops further collection of data (block 710) and compares the stored opening data with a known "good" set of data (block 712) and determines if the comparison is outside a tolerance or threshold (block 714). The tolerance may be a 1% tolerance, similar to the tolerance that is described above in connection with the valve closing test (FIG. 5). If the comparison is outside the tolerance, then the positioner sets an alert indication or sends an alarm message (block 716).

FIG. 8 illustrates an alternative embodiment to FIG. 7, wherein the comparison of the data (840) and the tolerance or threshold check (842) is performed immediately after the reading of the data (806). Like the embodiment of FIG. 6, the embodiment of FIG. 8 does not require the additional storage of the read data. In particular, the operational blocks 800, 802, 804, 806, 808, and 816 are similar to operational blocks 700, 702, 704, 706, 708, and 716 of FIG. 7, respectively. Therefore, the below explanation of the method as illustrated by FIG. 8 is focused on the differences of the operations between FIG. 7 and FIG. 8.

FIG. 8 illustrates an alternative embodiment to FIG. 7, wherein the reading of data operation does not call for the storing of the data and wherein the comparison of the data is performed more immediately after the reading of the data. The pressure and position data may be read and then compared to a tolerance or threshold on a real time basis, without requiring any longer term storage. For example, the positioner 109 may read the pressure and position data (block 800) and then compare the pressure and position data with a known good set of data (block 840) and then determine whether the comparison is within a tolerance (block 842).

As discussed above, positioner 109 may execute any of the methods of FIG. 5, 6, 7, or FIG. 8 depending upon whether the setpoint is less than or greater than the cutoff. In an alternate embodiment of FIGS. 5, 6, 7 or FIG. 8, the positioner 109 may read and store data for a different duration or any other specified duration. A different duration of the reading operation may be accomplished by using a different cutoff value.

Alternatively, positioner 109 may read and store data continuously during normal operations while the valve is both opening and closing and in between opening and closing operations. Positioner 109 may trigger its comparison operations (e.g., blocks 512, 712) upon the receipt of a desired setpoint value. For example, a comparison may be triggered when the desired setpoint is above or below any specified cutoff value, such as 0.6% in case of an opening operation, or when the setpoint value is 0% or below in the case of a closing operation.

Variations of the methods embodied in FIGS. 5, 6, 7, and 8, including variations that combine any of the blocks of FIGS. 5 and 6 and 7 and 8 will suggest themselves to those skilled in the art of software programming or of valve operations and who have had the benefit of this disclosure. For more detailed information on using computers to evaluate valve operations, see U.S. Pat. No. 7,478,012, titled, "Computerized Evaluation of Valve Signature Graphs," assigned to Fisher Controls International LLC, which is incorporated herein by reference in its entirety.

Another example embodiment of the valve seat integrity test described herein may include automatically testing a valve seating integrity of a valve in a process control system, wherein the valve includes a valve seat and a valve closing element that moves respectively toward and away from the valve seat during a closing operation and an opening operation of the valve. The method includes receiving a setpoint from a controller of the process control system, moving the valve closing element toward a position corresponding to the setpoint for the valve, performing a valve seating integrity test, automatically, by gathering valve seating integrity test data during movement of the valve closing element toward the position corresponding to the setpoint. The method also includes performing the valve seating integrity test by evaluating valve seating integrity test data without interrupting the operation of the process control system and without isolating the valve from the process control system. The operation of the process control system includes a closed loop process control operation including the movement of the valve closing element toward the position corresponding to the setpoint or any other definition of a closed loop process control operation.

Additionally, the positioner 109 may receive the setpoint and gather the valve seating integrity test data and evaluate the valve seating integrity test data. Alternatively, the positioner 109 may receive the setpoint and gather the valve seating integrity test data and send the valve seating integrity test data to the controller 12 for evaluation.

Additionally, the positioner 109 may receive the setpoint and gather the valve seating integrity test data and send the test data to a software application residing on a controller, I/O card, workstation, or other platform, which is permanently or temporarily connected to the control system, either continuously or after having determined that the valve closing operation or the valve opening operation have reached a state for evaluation. The valve closing operation or the valve opening operation may reach a state that is to be evaluated when the gathered valve seating integrity test data and/or setpoint value reaches any of the values that are defined by any of the methods described above, which include any values in accordance with FIGS. 3-10, or any other definition of a valve closing or opening operation. Alternatively, the positioner 109 may gather the test data and perform any one or more of manipulation, grouping, or transformation of the test data before sending the data to the controller 12 so that the communications link between the positioner and the controller may be used more efficiently.

The positioner 109 (or controller 12) may be configured to evaluate the valve seating integrity test data continuously during all or some normal process control operations (e.g., valve closing or opening operation) by either comparing a predetermined set of valve seating integrity test data that corresponds with the gathered valve seating integrity test data, or by determining a mathematically calculated slope value based on the gathered valve seating integrity test data and comparing the mathematically calculated slope value with a threshold slope value. The valve seating integrity test data may include position data and/or pressure data, and time data; or position data and pressure data, or any combination of data that is capable of being observed during a valve closing operation or a valve opening operation.

Any of the embodiments of the valve seating integrity test described herein may produce an alert or send an alarm message to a local or a remote location. For example, the positioner 109 of FIG. 2 may produce an alert or send an alarm message to a remote diagnostics/maintenance application 33 or controller 12 of FIG. 1. Additionally or alternatively, positioner 109 may produce an alert by turning on a light emitting diode or changing a liquid crystal display (LCD) that is located in the housing of the valve 102.

Embodiments of the valve seat integrity test described herein may be performed on any one or more of the valves in the process control system while the process control system maintains operations. As discussed above, embodiments of the invention may detect valve problems that include problems worn out seat components, seat positioning problems, and seat erosion problems. For information on these and other valve problems that may be avoided using embodiments of the invention described herein see (1) U.S. Pat. No. 6,298,454, titled "Diagnostics in a Process Control System," assigned to Fisher-Rosemount Systems, Inc. and (2) U.S. Pat. No. 7,478,012, titled, "Computerized Evaluation of Valve Signature Graphs," assigned to Fisher Controls International LLC, both of which are herein incorporated by reference in their entirety.

As discussed above, advantages of the present automatic valve seating integrity test over the conventional valve signature tests may include that the test does not require stopping the operation of the valve, or stopping a process that is using the valve, or isolating the valve to avoid an interruption of the process, or requiring the analysis of a human operator. A user is not required to manually perform the valve seating integrity test embodiments described herein, and a user is not required to manually interpret the results of the valve seating integrity test embodiments described herein. Therefore, embodiments of the test described herein may be better able to determine whether and when the valve seating integrity is compromised. Also embodiments of the valve seating integrity test described herein may be better able to maintain the productivity and safety levels of the operations of which the valve is a part.

For example, the valve may be a part of a single control loop operation that is controlled locally by valve positioner 109 (FIG. 2) itself or the valve may be apart of an operation that involves a more complex process control system, which is controlled by controller 12 (FIG. 1). Either way, the automatic valve signature test methods described herein enable the test to be run during normal process control operations, which involve the valve that is to be tested. Normal process plant operations include operations wherein the controller sends a control signal to the valve in response to a closed loop process control operation of a control routine configured to be executed by the controller. Normal process plant operations also include operations wherein the controller is configured to process the position data as feedback information for use by a closed loop control routine configured to be executed by the controller.

The following discussion is primarily with reference to the subject matter illustrated in FIG. 1.

Each controller 12, which may be any type of process controller or a more specific type of process controller, such as the DeltaV™ controller sold by Emerson Process Management, stores and executes a controller application that implements a control strategy using any number of different, independently executed, control modules or blocks 50, 50. Each control module 50 may be made up of what are commonly referred to as function blocks wherein each function block is apart or a subroutine of an overall control routine and operates in conjunction with other function blocks (via communications called links) to implement process control loops within process plant 10. Function blocks may be objects in an object oriented programming protocol. Function blocks may perform an input function, such as that associated with a transmitter, a sensor or other process parameter measurement device, a control function, such as that associated with a control routine that performs PID, fuzzy logic, etc. control. Function blocks may perform an output function that controls the operation of some device, such as a valve, to perform some physical function within process plant 10. Hybrid and other types of complex function blocks exist such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function block, ladder logic, etc. and are not limited to being designed and implemented using the function block or any other particular programming technique. Each of the controllers 12 may also support the AMS® Suite of applications and may use predictive intelligence to improve availability and performance of production assets including mechanical equipment, electrical systems, process equipment, instruments, field and smart field devices 14, 16, and valves.

In plant 10 illustrated in FIG. 1, field devices 14 and 16 connected to controllers 12 may be standard 4-20 ma devices, or may be smart field devices, such as HART, Profibus, or FOUNDATION™ Fieldbus field devices, which include a processor and a memory, or may be any other desired type of devices. Some of these devices, such as Fieldbus field devices (each labeled with reference number 16 in FIG. 1), may store and execute modules, or sub-modules, such as function blocks, associated with the control strategy implemented in controllers 12. Function blocks 40 which are illustrated in FIG. 1 as being disposed in two different ones of Fieldbus field devices 16 may be executed in conjunction with the execution of the control modules 50 within controllers 12 to implement process control, as is well known. Of course, field devices 14 and 16 may be any types of devices, such as sensors, valves, transmitters, positioners, etc. and I/O devices 18 may be any types of I/O devices conforming to any desired communication or controller protocol such as HART, Fieldbus, Profibus, etc.

In process plant 10 of FIG. 1, workstations 20-23 may include various applications that are used for various different functions performed by the same or different personnel within plant 10. Each workstation 20-23 includes a memory, that stores various applications, programs, data structures, etc., and a processor which may be used to execute any of the applications stored in the memory, such as a routine including all or any portion of the seat integrity test system and/or method described herein.

Workstations 20-23 include hardware and/or software that provide operation, configuration, simulation, and diagnostic and/or maintenance operations to the plant from a high process control system level to the lower operational level of a single field device. While the various associated applications 30-33 are illustrated in FIG. 1 as being located in different workstations dedicated to one of those functions, it will be understood that various applications 30-33 associated with these or other plant functions may be located in and executed in the same or different workstations or computers within plant 10, depending on the needs and set up of plant 10. Thus, for example, one or more control applications 30 and maintenance/diagnostic applications 33 may be executed in the same workstation 20-23, while different individual maintenance/diagnostic applications 33 or different individual control applications 30 may be executed in different ones of workstations 20-23 and/or controllers 12.

In the example illustrated in FIG. 1, workstation 23 is illustrated as a diagnostic/maintenance workstation and includes a number of diagnostic and/or maintenance applications 33 that may be used by various personnel to test or view the needs of the overall plant 10, and/or to test or view the operating or working condition of various devices 12, 14, 16, etc. Applications 33 may include support applications 33A such as other maintenance/diagnostic applications, calibration applications, vibration analysis applications, report generation applications or any other support applications, such as test analysis applications that may be used to assist a person in performing maintenance/diagnostic functions within plant 10. For example, a maintenance/diagnostic application 33A may include a valve seat integrity testing application 33B. Alternatively or additionally, the valve seat integrity testing application 33B may be implemented wholly and/or partly at any controller 12 or any field device 14, 16, or a combination of the three. The valve seat integrity testing application 33*b* may incorporate any combination of function blocks 40 control modules 50 control applications 30 and maintenance/diagnostic applications 30-33. The valve seat integrity testing application 33*b* may also be a software algorithm that is entirely embedded in a local processor of any valve field device 14, 16.

As discussed above, any of the system wide applications, such as applications 30, 31, 32, 33, 33A, 33B and/or any of the local applications that may be stored in control unit 111 or storage device 114 of positioner 109 (or a separately functioning local test control unit 111) may implement any of the methods described herein. The methods described herein may be implemented via the valve seating integrity testing system 100 of FIG. 2 or via an alternative embodiment, such as an embodiment where the valve positioner may be separated from the control unit of the valve seating integrity testing system.

The foregoing detailed description is exemplary only as the scope of the invention is defined by the following claims.

What is claimed is:

1. A method for testing valve seating integrity for a valve, the method comprising:
providing a process control system including a valve;
receiving a control signal value from a controller of the process control system;
operating the valve in accordance with the control signal value that reflects the extent to which the valve is to be open;
performing a valve closing operation according to the received control signal value;
reading the control signal value and position data of the valve;
determining whether the control signal value is below a predetermined cutoff value associated with the valve seating integrity;
when the control signal value is determined to be below the predetermined cutoff value, determining whether the position data is above the cutoff value;
when the position data is determined to be above the cutoff value, reading and storing the position data and pressure data associated with the valve closing operation;
determining whether the position data indicates a continuation of the valve closing operation;
while the position data indicates a continuation of the valve closing operation, continuing the reading and storing of the position data and the pressure data associated with the valve closing operation;
performing a comparison between the stored position data and pressure data accumulated during the valve closing operation to a previously stored set of position data and pressure data corresponding to an acceptable valve seating integrity;
making a determination from the comparison whether a predetermined threshold associated with the previously stored set of position data and pressure data has been exceeded; and
generating an alert in response to the determination that the threshold was exceeded.

2. The method of claim 1, wherein:
the performing of the valve closing operation is configured to occur during normal process plant operations, wherein the controller sends the control signal to the valve in response to a closed loop process control operation of a control routine configured to be executed by the controller.

3. The method of claim 1, wherein:
the performing of the valve closing operation is configured to occur during normal process plant operations, wherein the controller is configured to process the position data as feedback information for use by a closed loop control routine configured to be executed by the controller.

4. The method of claim 1, wherein:
the cutoff value for the valve closing operation is 0.5%.

5. The method of claim 1, wherein:
the control signal value is a setpoint.

6. The method of claim 1, wherein:
wherein the position data indicates a relative position of a valve closing element with respect to a valve seat.

7. The method of claim 1, wherein:
the threshold value is a tolerance value determined for each of a predetermined set of position and pressure data that correspond with the stored position and pressure data.

8. The method of claim 1, wherein:
the threshold value is a mathematically calculated slope value determined for each of a predetermined set of position and pressure data that correspond with the stored position and pressure data.

9. The method of claim 1, wherein:
the continuing the reading and storing of the position data and the pressure data associated with the valve closing operation is continued until the read position data indicates the valve is not moving.

10. The method of claim 1, wherein:
the alert comprises a visible alert indication or an alarm message.

11. The method as recited in claim 1 further comprising:
reading and storing a plurality of instances of said pressure and position data;
performing the comparison for each instance of said data; and
completing the comparison when all instances of the read and stored data have been included in the comparison.

12. The method of claim 1, wherein:
the previously stored set of data includes at least one of either (i) use set of data provided by the manufacturer of the valve or (ii) a set of data previously gathered from the valve when the valve seating integrity was undeteriorated.

13. The method as recited in claim 1 wherein:
the previously stored set of data includes a model data set based on pressure and position data gathered from valves other than the valve undergoing testing.

14. A method for testing valve seating integrity for a valve, the method comprising:
providing a process control system including a valve;
receiving a control signal value from a controller of the process control system;
operating the valve in accordance with the control signal value that reflects the extent to which the valve is to be open;
performing a valve closing operation according to the received control signal value;
reading the control signal value and position data of the valve;
determining whether the control signal value is below a predetermined cutoff value associated with the valve seating integrity;
when the control signal value is determined to be below the predetermined cutoff value, determining whether the position data is above the cutoff value;
when the position data is determined to be above the cutoff value, reading the position data and pressure data associated with the valve closing operation;
performing a comparison between a value based on the position data and pressure data that was read during the valve closing operation with a threshold value corresponding to an acceptable valve seating integrity;
making a determination from the comparison whether a predetermined threshold has been met; and
generating an alert in response to the determination that the threshold was met.

15. The method as recited in claim 14, wherein:
the value based on the position data and pressure data that was read during the valve closing operation is a mathematically determined slope value and the threshold value is a threshold slope value determined from a previously stored set of position data and pressure data corresponding to an acceptable valve seating integrity.

16. The method as recited in claim 15, further comprising:
determining whether the position data indicates a continuation of the valve closing operation; and
while the position data indicates a continuation of the valve closing operation, continuing the reading of the position data and the pressure data associated with the valve closing operation.

17. The method as recited in claim 14, wherein:
the threshold value is a tolerance value determine for each of a predetermined set of position and pressure data that correspond with the read position and pressure data.

18. A method for testing valve seating integrity for a valve, the method comprising:
providing a process control system including a valve;
receiving a control signal value from a controller of the process control system;
operating the valve in accordance with the control signal value that reflects the extent to which the valve is to be open;
performing a valve opening operation according to the received control signal value;
reading the control signal value and position data of the valve;
determining whether the control signal value is above a predetermined cutoff value associated with the valve seating integrity;
when the control signal value is determined to be above the predetermined cutoff value, determining whether the position data is below the cutoff value;
when the position data is determined to be below the cutoff value, reading and storing the position data and pressure data associated with the valve opening operation;
determining whether the position data indicates a continuation of the valve opening operation;
while the position data indicates a continuation of the valve opening operation, continuing the reading and storing of the position data and the pressure data associated with the valve opening operation;
performing a comparison between the stored position data and pressure data accumulated during the valve opening operation to a previously stored set of position data and pressure data corresponding to an acceptable valve seating integrity;
making a determination from the comparison whether a predetermined threshold associated with the previously stored set of position data and pressure data has been met; and
generating an alert in response to the determination that the threshold was met.

19. The method of claim 18, wherein:
the performing of the valve opening operation is configured to occur during normal process plant operations, wherein the controller sends the control signal to the valve in response to a closed loop process control operation of a control routine configured to be executed by the controller.

20. The method of claim 18, wherein:
the performing of the valve opening operation is configured to occur during normal process plant operations, wherein the controller is configured to process the position data as feedback information for use by a closed loop control routine configured to be executed by the controller.

21. The method of claim 18, wherein:
the cutoff value for the valve opening operation is 0.5%.

22. The method of claim 18, wherein:
the control signal value is a setpoint.

23. The method of claim 18, wherein:
wherein the position data indicates a relative position of a valve closing element with respect to a valve seat.

24. The method of claim 18, wherein:
the threshold value is a tolerance value determined for each of a predetermined set of position and pressure data that correspond with the stored position and pressure data.

25. The method of claim 18, wherein:
the threshold value is a mathematically calculated slope value determined for each of a predetermined set of position and pressure data that correspond with the stored position and pressure data.

26. The method of claim 18, wherein:
the continuing the reading and storing of the position data and the pressure data associated with the valve closing operation is continued until the read position data indicates the valve is not moving.

27. The method of claim 18, wherein:
the alert comprises a visible alert indication or an alarm message.

28. The method as recited in claim 18, further comprising:
reading and storing a plurality of instances of said pressure and position data;
performing the comparison for each instance of said data; and
completing the comparison when all instances of the read and stored data have been included in the comparison.

29. The method of claim 18, wherein:
the previously stored set of data includes at least one of either (i) a set of data provided by the manufacturer of the valve or (ii) a set of data previously gathered from the valve when the valve seating integrity was undeteriorated.

30. The method as recited in claim 18, wherein:
the previously stored set of data includes a model data set based on pressure and position data gathered from valves other than the valve undergoing testing.

31. A method for testing valve seating integrity for a valve, the method comprising:
providing a process control system including a valve;
receiving a control signal value from a controller of the process control system;
operating the valve in accordance with the control signal value that reflects the extent to which the valve is to be open;
performing a valve opening operation according to the received control signal value;
reading the control signal value and position data of the valve;
determining whether the control signal value is above a predetermined cutoff value associated with the valve seating integrity;
when the control signal value is determined to be above the predetermined cutoff value, determining whether the position data is below the cutoff value;
when the position data is determined to be below the cutoff value, reading the position data and pressure data associated with the valve opening operation;
performing a comparison between a value based on the position data and pressure data that was read during the valve opening operation with a threshold value corresponding to an acceptable valve seating integrity;

making a determination from the comparison whether a predetermined threshold has been met; and generating an alert in response to the determination that the threshold was met.

32. The method as recited in claim 31, wherein:

the value based on the position data and pressure data that was read during the valve opening operation is a mathematically determined slope value and the threshold value is a threshold slope value determined from a previously stored set of position data and pressure data corresponding to an acceptable valve seating integrity.

33. The method as recited in claim 32, further comprising:

determining whether the position data indicates a continuation of the valve opening operation; and while the position data indicates a continuation of the valve opening operation, continuing the reading of the position data and the pressure data associated with the valve closing operation.

34. The method as recited in claim 31, wherein:

the threshold value is a tolerance value determine for each of a predetermined set of position and pressure data that correspond with the read position and pressure data.

35. A method for automatically testing a valve seating integrity of a valve in a process control system, wherein the valve includes a valve seat and a valve closing element that moves respectively toward and away from the valve seat during a closing operation and an opening operation of the valve, the method comprising:

receiving a setpoint from a controller of the process control system;

moving the valve closing element toward a position corresponding to the setpoint for the valve;

performing a valve seating integrity test, automatically, by gathering valve seating integrity test data during movement of the valve closing element toward the position corresponding to the setpoint;

performing the valve seating integrity test by evaluating valve seating integrity test data without interrupting the operation of the process control system and without isolating the valve from the process control system;

wherein the operation of the process control system includes a closed loop process control operation including the movement of the valve closing element toward the position corresponding to the setpoint.

36. The method as recited in claim 35, wherein:

the setpoint is received by a positioner; and the positioner is configured to evaluate the valve seating integrity test data.

37. The method as recited in claim 35, wherein:

the setpoint is received by a positioner; and the positioner is configured to store the valve seating integrity test data and send the valve seating integrity test data to a software application, wherein the software application evaluates the valve seating integrity test data.

38. The method as recited in claim 35, wherein:

the setpoint is received by a positioner; and the positioner sends the valve seating integrity test data to a software application either continuously or after having determined that the valve closing operation or the valve opening operation has reached a state for evaluation.

39. The method as recited in claim 35, wherein:

the setpoint is received by a positioner; and the positioner is configured to continuously evaluate the valve seating integrity test data either by comparing a predetermined set of valve seating integrity test data that corresponds with the gathered valve seating integrity test data, or by determining a mathematically calculated slope value based on the gathered valve seating integrity test data and comparing the mathematically calculated slope value with a threshold slope value.

40. The method as recited in claim 35, wherein:

the setpoint is received by a positioner; and the positioner is configured to continuously evaluate the valve seating integrity test data either by comparing a predetermined set of valve seating integrity test data that corresponds with the gathered valve seating integrity test data, or by determining a mathematically calculated slope value based on the gathered valve seating integrity test data and comparing the mathematically calculated slope value with a threshold slope value; and the valve seating integrity test data includes position data and/or pressure data, and time data; or position data and pressure data.

* * * * *

UNITED STATES PATENT AND TRADEMARK OFFICE
CERTIFICATE OF CORRECTION

PATENT NO.       : 8,421,643 B2
APPLICATION NO.  : 12/957836
DATED            : April 16, 2013
INVENTOR(S)      : Bruce Frederick Grumstrup Page 1 of 1

It is certified that error appears in the above-identified patent and that said Letters Patent is hereby corrected as shown below:

In the Specification:

At column 15, line 11, "apart" should be -- a part --.

At column 15, line 35, "apart" should be -- a part --.

In the Claims:

At column 18, line 31, in claim 12, "use" should be -- a --.

Signed and Sealed this
Seventh Day of April, 2015

Michelle K. Lee
*Director of the United States Patent and Trademark Office*